(12) United States Patent
Beillas et al.

(10) Patent No.: US 9,243,966 B2
(45) Date of Patent: Jan. 26, 2016

(54) PRESSURE SENSOR FOR ANTHROPOMORPHIC DUMMIES

(71) Applicant: INSTITUT FRANCAIS DES SCIENCES ET TECHNOLOGIES DES TRANSPORTS, Champs sur Marne (FR)

(72) Inventors: Philippe Beillas, Lyons (FR); Francois Alonzo, Chassieu (FR)

(73) Assignee: INSTITUT FRANCAIS DES SCIENCES ET TECHNOLOGIES DES TRANSPORTS, DE L'AMENAGEMENT ET DES RESEAUX, Champs sur Marne (FR)

( * ) Notice: Subject to any disclaimer, the term of this patent is extended or adjusted under 35 U.S.C. 154(b) by 51 days.

(21) Appl. No.: 14/351,587

(22) PCT Filed: Oct. 12, 2012

(86) PCT No.: PCT/FR2012/052332
§ 371 (c)(1),
(2) Date: Apr. 14, 2014

(87) PCT Pub. No.: WO2013/054061
PCT Pub. Date: Apr. 18, 2013

(65) Prior Publication Data
US 2015/0276525 A1 Oct. 1, 2015

(30) Foreign Application Priority Data

Oct. 14, 2011 (FR) ...................................... 11 59291

(51) Int. Cl.
*G01L 1/02* (2006.01)
*G01M 7/08* (2006.01)
*G01L 7/00* (2006.01)
*G09B 23/30* (2006.01)

(52) U.S. Cl.
CPC .. *G01L 7/00* (2013.01); *G09B 23/30* (2013.01)

(58) Field of Classification Search
CPC .................................. G01L 1/02; G01M 7/08
See application file for complete search history.

(56) References Cited

U.S. PATENT DOCUMENTS

| 4,409,835 A * | 10/1983 | Daniel ................... | A61B 5/103 434/274 |
| 2007/0279643 A1* | 12/2007 | Elhagediab ............ | G01B 11/16 356/614 |

(Continued)

FOREIGN PATENT DOCUMENTS

| EP | 0 230 315 | 7/1987 |
| FR | 1 426 249 | 1/1966 |

(Continued)

*Primary Examiner* — Lisa Caputo
*Assistant Examiner* — Jamel Williams
(74) *Attorney, Agent, or Firm* — Clark & Brody

(57) ABSTRACT

The present invention relates to a pressure sensor for measuring the pressures experienced by an anthropomorphic dummy in an abdominal or thoracic section of the trunk of said dummy. This sensor comprises at least two fluid-tight flexible pressure-measurement chambers (4) arranged in the abdominal or thoracic section of the trunk of said dummy on each side of a sagittal median plane of said abdominal or thoracic section, said pressure-measurement chambers (4) being filled with an incompressible fluid and each comprising at least one pressure-measurement cell (5) able at output thereof to deliver an electric signal indicative of the pressure of said fluid in said pressure-measurement chambers.

14 Claims, 3 Drawing Sheets

(56) References Cited

U.S. PATENT DOCUMENTS

Figure 1:
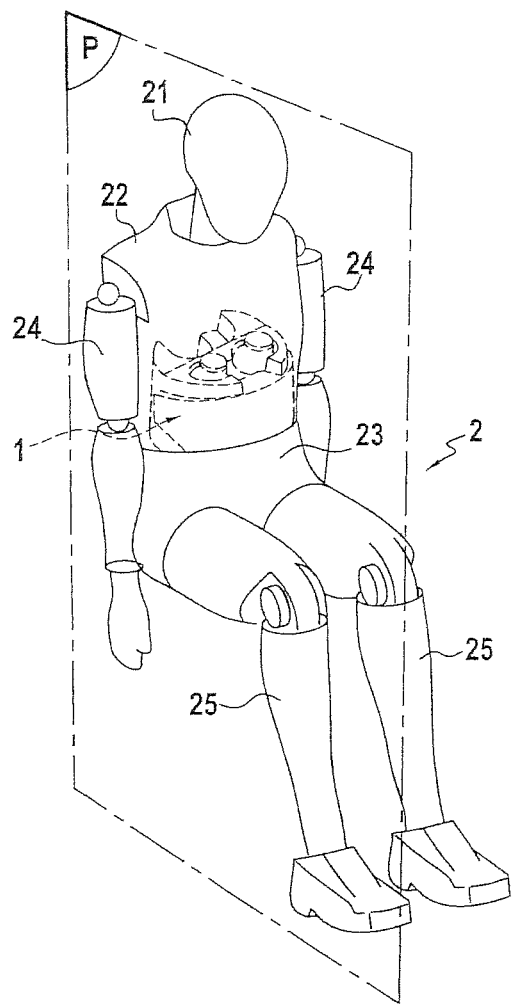

2011/0239731 A1* 10/2011 Lisseman ............... G09B 23/30
73/12.01
2013/0213155 A1* 8/2013 Ozawa ................. G01L 5/0052
73/866.4

FOREIGN PATENT DOCUMENTS

| FR | 1 438 366 | 5/1966 | |
| FR | 2 683 320 | 5/1993 | |
| FR | 2683320 A1 * | 5/1993 | ............... G01L 1/02 |

* cited by examiner

PRESSURE SENSOR FOR ANTHROPOMORPHIC DUMMIES

The present invention relates to intra-abdominal or intra-thoracic pressure sensors for anthropomorphic dummy and, more generally, any model biomechanical used to study the different effects produced by shocks on a human body, especially during transportation accidents such as in road traffic, rail or air transport.

The aim of the invention is particularly, though not exclusively, the domain of the study of physical phenomena and corollary bodily injuries arising in road traffic accidents, especially involving automobiles. A preferred domain of application of the invention is the study of abdominal wounds during road traffic accidents.

To conduct such studies, for some time now so-called anthropomorphic test dummies have been used whereof the physical properties of sizes, mass and body density are the closest possible to those of real humans so that their dynamic behaviour during shocks and accidents caused on purpose during <<crash tests>> of vehicles is the closest possible to that of human beings. These dummies have all the essential elements constituting a human being, such as head, thorax, abdomen, limbs, etc., and are placed in vehicles in place of the driver and passengers. Different types of tests are then performed with these vehicles and the behaviour of the dummies and the effects, on them, of shocks they have undergone during the accident are studied, especially in reaction to the different safety systems such as safety belts and airbags which can cause different bodily injuries despite their primary function of securing occupants in a vehicle.

One of the studies conducted concerns organic injuries linked to considerable pressures of safety belts on the abdomen and the thorax of passengers of vehicles during accidents, especially forces applied to the abdomen by the pelvic part of the belt passing across the pelvis. Lesions to the abdomen can also be created by loadings on other contact surfaces such as the door during lateral shock, or a shelf in a rail environment.

The intensities of such loadings are currently evaluated in simulation and real tests by means of pressure sensors housed in the abdominal part of anthropomorphic dummies. These sensors are constituted essentially by a chamber of determined volume filled with fluid and comprising a pressure sensor for measuring loading intensity, in the body of the dummy, of the sub-abdominal part of the belt during a frontal or lateral vehicle shock. An example of such a pressure sensor is described especially in patent FR 2 683 320 of the applicant.

In the same sense, U.S. Pat. No. 4,409,835 describes a system for measuring the pressure experienced by an anthropomorphic dummy in its thoracic section. This measuring system comprises a plurality of traverses extending above each other to simulate the thoracic section. Each traverse is equipped with two tri-axial pressure sensors arranged on either side of the median sagittal plane and each made up of a rigid housing fixed on the traverse.

Sensors known to date are not entirely satisfactory. In particular, an initial problem with these sensors is the impossibility of optimal discrimination of pressure forces undergone by the different organs of the abdomen and according to the orientation of shocks undergone by a vehicle during an accident. Yet, such discrimination of forces as a function of the nature of the shocks experienced is important to the extent where tolerance by organs of the abdomen to pressure is different according to whether they are located in the lower part, the upper part and/or laterally in the abdomen.

Another problem of known intra-abdominal pressure sensors is their stability and resistance in anthropomorphic dummies. In fact, whether they are fixed rigidly in the abdominal part of dummies and in this case do not react faithfully during shocks near their point of attachment, or they are freely arranged without being fixed in channels provided to this effect, in which case they are more mobile than real organs and in some cases can even be expelled during shocks. In some cases, these problems of stability of sensors negatively impact the fidelity and sensitivity of responses of sensors during tests, and comprehension of biomechanical phenomena occurring during accidents.

In the prior art, document US 2011/0239731 also discloses a measuring system of forces experienced by an anthropomorphic dummy. This measuring system comprises a layer of material sensitive to the pressure and arranged between internal and external support sheets. Such a measuring system is not adapted to discriminate and determine the pressure forces undergone by the different organs of the human body during shock. In fact, this system measures surface forces which have no direct rapport with internal anatomical structures of the human body and the transmission path of forces.

The aim of the present invention is therefore to rectify the disadvantages of known former solutions by proposing an intra-abdominal pressure sensor for anthropomorphic dummy, which is fully adapted to this type of dummy when it is intended to be on board in a transport vehicle to undergo an accident caused experimentally and which produces reliable evaluations of forces applied to the abdomen of dummies during such an accident without having the disadvantages of known sensors such as mentioned previously.

The aim of the invention in particular is to provide a pressure sensor which is stable in an anthropomorphic dummy and provide reliable and faithful pressure measuring, irrespective of the orientation of the shock experienced and the intensity of the latter to estimate as precisely as possible the risks of lesions to organs of the abdomen of automobile passengers during traffic accidents.

In this aim, the present invention proposes a pressure sensor for measuring pressures undergone by an anthropomorphic dummy in an abdominal or thoracic section of the trunk of said dummy. According to the invention, this pressure sensor comprises at least two sealed pressure-measurement chambers arranged in the abdominal or thoracic section on either side of a median sagittal plane of said abdominal or thoracic section, said chambers being filled with incompressible fluid and comprising each at least one pressure-measurement cell capable of delivering at its outlet an electric signal representative of the pressure of said fluid in said chambers.

The pressure sensor of the invention detects a mechanical charge of a body zone such as the abdomen and quantifies its intensity, so that the latter can assist in estimating in laboratory the risk of organic lesion. Mechanical stress can be applied by a vehicle safety belt in which the anthropomorphic dummy is placed during testing and can occur for example during a transitory event including accidents, incidents, falls, triggering of active devices such as airbags or other active safety devices. Mechanical stress can also result from impacts of the dummy against various internal parts of the vehicle at the time of shock.

The pressure sensor of the invention produces an estimation of the intensity of mechanical stress applied to the abdominal region by way of at least two pressure-measurement chambers placed in the body of the dummy on either side of the sagittal plane of the abdominal or thoracic section of the dummy. So, the pressure sensor of the invention is sensitive to loadings in several directions, especially frontal, lateral or oblique relative to the dummy.

According to an advantageous embodiment, the pressure sensor can also comprise more than two pressure-measurement chambers for better location of the loading and associated potential lesions. For example, the use of pressure-measurement chambers separated for the right and left of the abdomen dissociates loadings applied respectively to the regions of the liver and of the spleen. Similarly, the use of distinct pressure-measurement chambers in the upper and/or lower part of the abdomen of the dummy dissociates loadings applied to the full organs such as the liver and the spleen (located in the upper part of the abdomen) from loadings applied to the hollow organs such as the small intestine and the urinary pressure-measurement chamber (located in the lower region).

The different pressure-measurement chambers are each filled, at least partially, with incompressible fluid to ensure propagation of pressure exerted inside the chambers to the pressure-measurement cells.

According to various preferred characteristics of the pressure sensor of the invention:
- The pressure-measurement chambers comprise several internal compartments separated by partitions and each filled with incompressible fluid, the chambers each comprising at least one pressure-measurement cell;
- the pressure-measurement chambers comprise several internal compartments communicating with each other such that incompressible fluid can circulate between said compartments, said chambers comprising each at least one pressure-measurement cell;
- the incompressible filling fluid from the chambers comprises by choice: liquid, gel, emulsion;
- the chambers are constituted by an envelope of flexible material, especially polyurethane;
- the chambers are housed in recesses provided to this effect in the abdominal or thoracic section of the dummy and removable from these recesses;
- the envelope of the chambers locally has variations in thickness;
- the envelope of the chambers locally has variations in stiffness;
- the envelope of the chambers locally comprises superficial external reinforcements comprising a layer of additional material stuck on an external surface of the chambers;
- the envelope of the chambers is constituted by several materials having different mechanical properties or several elements of the same material but having different mechanical properties linked tightly by welding or adhesion;
- the chambers are blocked in vertical and/or horizontal translation in their recess by a mutual link or by adherence to a surface of the recesses;
- the chambers each comprise at least two pressure-measurement cells in two positions opposite the chamber;
- the chambers have a form of revolution.

Figure 2:
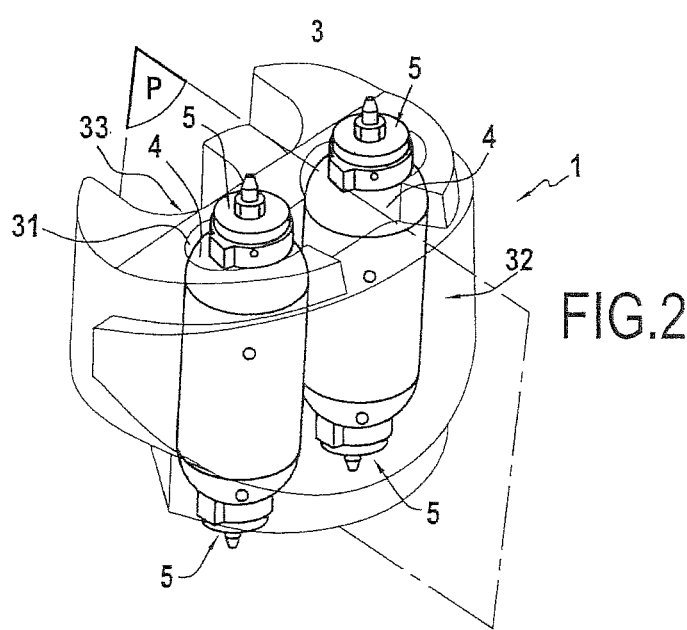
Figure 3:
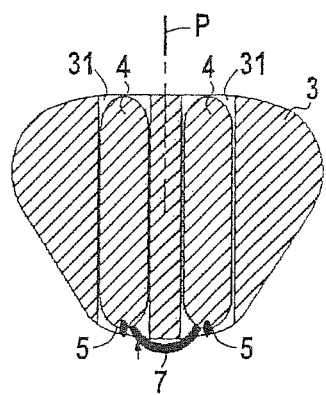
Figure 4:
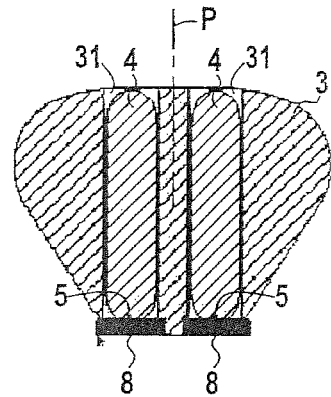
Figure 5:
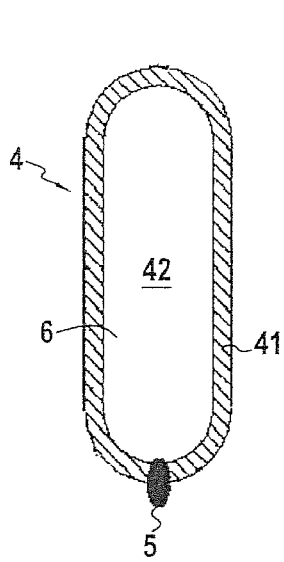

Other characteristics and advantages of the present invention will emerge from the following description given in relation to the attached diagrams by way of illustration, but not limiting, in which:

FIG. 1 represents a perspective view of an anthropomorphic dummy in which a pressure sensor according to the invention is installed, FIG. 2 represents, respectively in a frontal view and in a side elevation, in section, an embodiment of a pressure sensor according to the invention in association with an anthropomorphic dummy, FIGS. 3 and 4 represent two variant embodiments of a pressure sensor according to the invention with two individual pressure-measurement chambers joined solidly together and to the support block of the sensor respectively, FIGS. 5 to 14 represent different configurations of individual pressure-measurement chamber for the pressure sensor of the invention.

The figures annexed to the present description represent different embodiments of a pressure sensor 1 according to the invention. In the following description of these embodiments, implementing the pressure sensor 1 of the invention will be considered in an anthropomorphic dummy 2 used for safety test purposes for vehicles, generally called <<crash tests>>, by replacing human passengers to study the different effects produced on the human body during traffic accidents.

The anthropomorphic dummy 2 conventionally comprises a structure similar to that of a human. It therefore comprises a head 21, a trunk 22, a pelvis 23, all articulated relative to each other by an artificial spine (not shown) as well as two arms 24 articulated on the trunk 22 and two legs 25 articulated on the pelvis 23. These different parts making up the dummy 2 have density characteristics and mechanical properties similar, if not identical, to that of the human body. The structure of this dummy, well known to experts in the domain of biomechanical studies and accidentology will not be discussed in further detail here.

According to the invention, the pressure sensor 1 comprises essentially at least two sealed flexible pressure-measurement chambers 4 arranged in the abdominal section of the trunk 22 of the dummy on either side of a median sagittal plane P. The pressure-measurement chambers 4 are filled with incompressible fluid 6 and each comprises at least one pressure-measurement cell 5 capable of delivering at its outlet an electric signal representative of the pressure of said fluid 6 in said pressure-measurement chambers. In other terms, the variations in forces exerted on the measurement chambers 4, which have a supple or deformable character, result in variations in pressure of the incompressible fluid 6, detected by the pressure-measurement cells 5.

In the exemplary embodiment shown in the figures, the pressure sensor 1, and more particularly the pressure-measurement chambers 4 are arranged in a support block 3 held in the trunk 22 of the dummy 2, in the lower part of this trunk 22 representing the abdominal zone of the dummy 2. However, it should be noted that the use of a support block of the pressure sensor 1 is not indispensable to implementing the sensor or its proper operation. The disposition of the sensor directly in the trunk 22 of the dummy without support block 3 can especially be envisaged, provided said trunk directly allows proper maintaining of the sensor itself in position.

As shown in FIG. 2, the support block 3 of the pressure sensor 1 can comprise a block of rotomoulded polyurethane foam having a convex front face 32 and a substantially concave posterior face 33 imparting to the support block 3 an overall C-shape. Such support blocks are for example produced and marketed by the company Humanetics Innovative Solutions.

The two pressure-measurement chambers 4 of the sensor 1 are preferably housed each in a recess made in the trunk 22 of the dummy 2 or the support block 3. In FIGS. 2 to 4, the chambers 4 are each housed in a cylindrical recess 31, preferably terminating on either side over the entire height of the support block 3.

The two pressure-measurement chambers 4 are arranged symmetrically on either side of a median sagittal plane P of the support block 3, corresponding substantially to the sagittal plane of the trunk 22 of the dummy 2 in FIG. 1. This particular disposition of the two pressure chambers 4 is particularly important. In fact, it effectively gives the pressure sensor 1 of the invention sensitivity to any type and any direction of shock during an accident test, especially a frontal shock, a lateral shock or a shock having multiple frontal and lateral components, possibly causing compression forces of the abdomen of the trunk 22 of the dummy 2, both in horizontal and vertical planes.

In the embodiment shown in FIG. 2, the two pressure-measurement chambers 4 are each constituted by a cylindrical reservoir formed by an envelope 41 made of artificial material, of polyurethane or silicone type, closed at both its longitudinal ends by a pressure-measurement cell 5 of miniature industrial pressure sensor of membrane type, capable of transmitting an electric signal image of the pressure measured in the pressure-measurement chamber 4, where required connected to recording means. The two pressure-measurement chambers 4 preferably both have an identical internal volume. They are preferably filled with incompressible fluid 6. This incompressible fluid 6 can be liquid, gel or even emulsion, for example paraffin or silicone oil, Vaseline or echographic gel, or a mixture of these constituents. But according to the invention, the incompressible fluid 6 preferably comprises gel such as a mixture of Vaseline and paraffin for adapting its viscosity.

In general, the pressure-measurement chambers 4 are very flexible as they can be almost fully crushed flat. Such pressure-measurement chambers 4 are distinguished relative to hydraulic sensors which impose the use of rigid pieces and include rigid caps for transmitting force.

In an advantageous embodiment, the incompressible fluid 6 has a certain degree of viscosity so that it can adjust the mechanical response of the pressure sensor 1 and manage the time lag of arrival of the pressure wave when several measurement cells 5 are in the same chamber 4 during load testing of the dummy 2. The adjustment of the mechanical response and of the propagation of pressure can also be done by inserting an insert composed of alveolar material (foam) inside the chamber during manufacture, where the occupied volume can be partial or total, and the alveolae open or closed.

When the pressure-measurement chambers 4 are integrated into a support block 3 composed of foam, as in the embodiment described in FIGS. 1 to 4, the link between the pressure-measurement chambers 4 and the foam of the support block 3 at the level of the walls of the recesses 31 can be left to slide, as in FIG. 2, or adherent, according to the type of strain to be transmitted to the pressure-measurement chambers 4.

In particular, during lumbar flexion movements, the base of the osseous thorax and the diaphragm can apply vertical compression to the zone of the abdomen of the trunk of an individual. In the current state of biomechanical knowledge, it is not clear if this vertical compression increases the lesional risk pour the contents of the abdomen. If the risk does increase, coupling between flexion, vertical compression and pressure measurement would be preferable.

In this case, to take into account this risk in the pressure sensor 1, the pressure-measurement chambers 4 can be attached to the walls of the recesses 31, for example by adhesion or by direct integration during manufacture of the support block 3 or trunk 22 or even by giving them a non-cylindrical form enabling them to be coupled to the rest of the support block 3 such that they cannot move vertically in the recesses 31 and the support block 3.

Conversely, in the case of the absence of a rise in lesional risk, it would be preferable for pressure measurements not to be affected by vertical compression. As shown in FIG. 2, this can be achieved by using pressure-measurement chambers 4 of cylindrical form parallel to the principal axis of compression and by letting these pressure-measurement chambers 4 slide in the recesses 31 relative to the surrounding foam of the support block 3.

In this case, for proper control of pressure measurement performed during complex loading, the pressure-measurement chambers 4 should be prevented from migrating towards the thorax under the effect of compression and deceleration, while preventing straining them excessively by attaching them to the pelvis 23. To ensure this function, as shown in FIGS. 3 and 4, the pressure-measurement chambers 4 can be joined together at the level of at least two of their lower longitudinal ends by flexible link 7 or two bases 8 wider than the recesses 31 of the support block 3. This bond can also be made using adhesion, enlargement of the lower part of the envelopes 41 of the pressure-measurement chambers 4, or any other mechanical means. According to the present invention, joining the pressure-measurement chambers 4 together or to the support block 3 is particularly important for eliminating the effects of ejections from the pressure-measurement chambers sometimes encountered with known pressure sensors. Of course, when the pressure sensor 1 is implemented without support block 3, this problem of ejection is less but the bond between the chambers 4 remains considerable to keep them in measuring position in the dummy, irrespective of the stresses applied to said dummy.

It is preferred, according to the invention, that the pressure-measurement chambers 4 of the pressure sensor 1 are independent of and removable from the support block 3, and replaceable and adaptable as a function of the needs of loading testing to be conducted.

The present invention also improves the adaptability of the physical parameters of the pressure-measurement chambers 4 to best take into account in the anthropomorphic dummy 2 during testing on the anatomical reality of the human body as a function of the forces transmitted in case of shocks.

Also according to the invention, the pressure-measurement chambers can adopt different configurations and/or structures, described hereinbelow and shown schematically in FIGS. 5 to 14. In these figures, the pressure-measurement chambers 4 are shown in an axisymmetrical form of cylindrical transversal cross-section and oval longitudinal cross-section but any other form, preferably regular, can be envisaged.

In the simplest embodiment, the pressure-measurement chambers 4 of the pressure sensor 1 of the invention can be formed from a substantially cylindrical simple envelope 41 forming a single internal compartment 42 filled with incompressible fluid 6 and at one end, the lower one for example, fitted with an industrial pressure-measurement cell 5.

Figure 6:
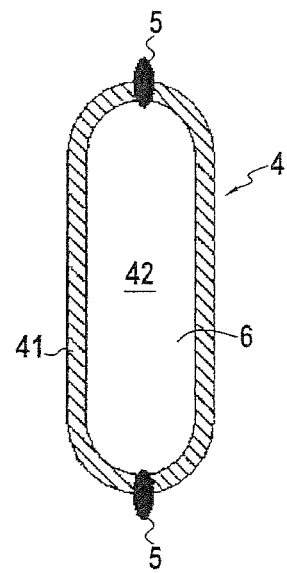

As shown in FIG. 6, the pressure-measurement chambers 4 can comprise at least two industrial pressure-measurement cells 5 at the upper and lower ends of the envelope 41 forming the pressure-measurement chamber 4. In this way, implanting of several pressure-measurement cells 5 per pressure-measurement chamber 4 best locates the zone of application of the external pressure forces by analysing the time lags between pressure signals coming from each pressure-measurement cell 5. This lag is the consequence of the propagation speed of the pressure wave and the distance between the source of the wave and the cells 5.

According to the invention, the multiplicity of pressure-measurement chambers 4 and pressure-measurement cells 5 allows better location of the loading applied to the zone of the abdomen of the dummy 2 and therefore the associated potential lesions on a human in case of a road accident. For example, the use of separate pressure-measurement chambers 4 for the right and left of the abdomen on either side of the sagittal plane P of the trunk 22 dummy 2 in the pressure sensor 1 of the invention dissociates the loadings applied respectively to the regions of the liver and of the spleen.

Similarly, even though not shown in the attached figures, use is also possible of pressure-measurement chambers 4 in the upper or lower part of the trunk 22 which dissociates the loadings applied to the full organs such as the liver and the spleen (located in the upper part of the abdomen) from the loadings applied to the hollow organs such as the small intestine and the urinary pressure-measurement chamber (located in the lower part of the abdomen).

Therefore, in general according to the invention, the number and the location of the pressure-measurement chambers 4 and the pressure-measurement cells 5 of the pressure sensor 1 can be adapted as a function of the type of application and location needs of loading during tests with the dummy 2.

Figure 7:
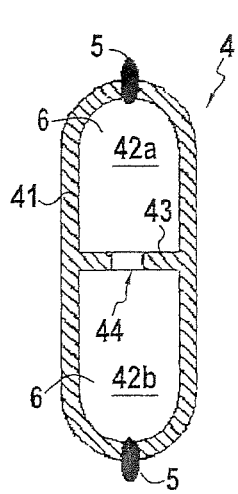
Figure 8:
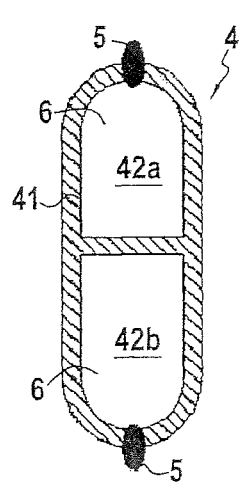

Further refining the comprehension of loading mechanisms of the abdomen in case of shocks is also possible, by operating either a fluidic communication bond between the pressure-measurement chambers 4 or, more simply, by compartmentalising said pressure-measurement chambers 4 as shown in FIGS. 7 and 8.

Accordingly, in FIG. 7, a pressure-measurement chamber 4 formed by an envelope 41 comprising two internal compartments 42a, 42b of the same volume separated by a partition 43 comprising communication orifice 44 between the two compartments 42a, 42b, each compartment 42a, 42b comprising a pressure-measurement cell 5.

FIG. 8 per se represents a variant embodiment of FIG. 7, in which the two compartments 42a, 42b are totally independent of each other and do not communicate with each other, the partition 43 being closed and sealed between two said compartments 42a, 42b.

A pressure-measurement chamber 4 such as shown in FIGS. 7 and 8 has the advantage of increasing the difference in pressure measured in the upper and lower part according to the location of the loading, while preserving transmission of pressure between the two chambers (which is an advantage relative to the use of chambers completely separate at top and bottom) and by using only one pressure sensor (which provides an economic advantage).

Figure 9:
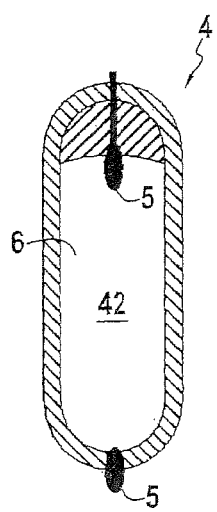

FIG. 9 per se represents a pressure-measurement chamber 4 incorporating inside the envelope 41, in the compartment 42 for filling incompressible fluid 6, a foam insert 11 stuck to the envelope 41 at one end of the compartment 42. In this embodiment, the foam insert 11 enables adaptation of the compressibility of the pressure-measurement chamber 4 and above all of the incompressible fluid 6 as a function of the nature of the loading to be tested by means of a pressure sensor 1 such as provided by the invention. In particular, such a configuration could consider the compressibility of hollow human organs due to the presence of gas and adapt the stiffness of the chamber as a function of compression.

Resistance to compression of the pressure-measurement chambers 4 and their sensitivity to external pressure according to different directions of loading stress can also be adjusted by local variations in stiffness of the envelope 41 of the pressure-measurement chambers 4 by local reinforcement of the envelope 41 of the pressure-measurement chambers 4 so as to reduce the proportion of external pressure transmitted to the pressure-measurement chamber 4 in the reinforced zones. So, it is possible to take into account local differences in tolerance to loading without boosting the number of pressure-measurement chambers 4 in the pressure sensor 1 or the number of pressure cells, or adjusting the sensitivity of the response in the direction of loading.

The stiffness of the measurement chambers is adjusted to correspond to the part of the body which they replace, such as the abdomen. So the measurement chambers participate in the response from this part of the body.

FIGS. 10 to 14 represent different embodiments of a pressure-measurement chamber 4 structured to obtain distinct local stiffness of the envelope 41. In these embodiments, the pressure-measurement chamber 4 comprises a single pressure-measurement cell 5; but it could comprise several, similarly.

Figure 10:
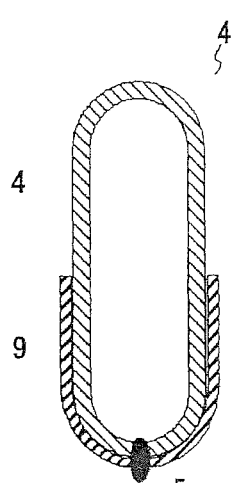
Figure 11:
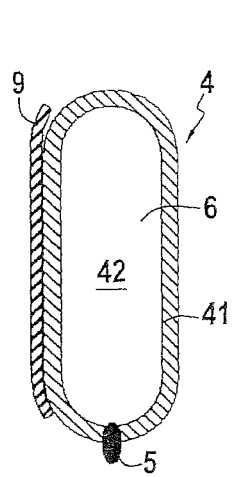

A first embodiment consists, as shown in FIGS. 10 and 11, of sticking or welding a piece of reinforcement 9, of different material(s) and/or mechanical properties, where required semi-rigid, on a portion of external wall of the envelope 41 of the pressure chamber 4 so as to modify the stiffness of the envelope 41 on the surface corresponding to this portion and to make it more resistant to mechanical compression strains than the rest of the envelope 41, devoid of such a reinforcement 9. This can reduce the pressure measured in a reinforced region to better resist shocks. For example, if the lower part of the abdomen has better tolerance to shocks, it is possible to reinforce the lower part of the chamber as shown in FIG. 11 so as to use a single level of pressure to predict lesions in the lower and upper part of the abdomen and have no need to localise the loading. Similarly, if the tolerance of the abdomen to shock were more considerable in lateral loading, a lateral reinforcement as shown in FIG. 11 would utilise the same pressure limit value for frontal or lateral loadings.

Figure 12:
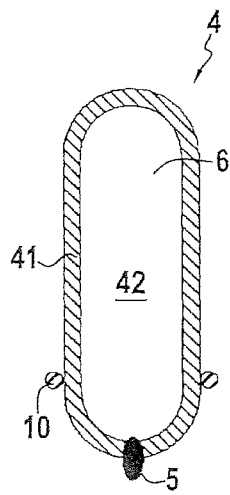

A second embodiment, similar, and shown in FIG. 12, can consist of procuring an annular reinforcement 10 of material(s) and/or different properties mechanical of the envelope 41, for reinforcing only one horizontal section of the envelope 41. Such an annular reinforcement 10 for example reduces the overall contribution of the reinforced zone of the envelope 41 with overall pressure measurement if this zone of the pressure-measurement chamber 4 corresponds to an anatomical region only slightly vulnerable to mechanical loading.

Figure 13:
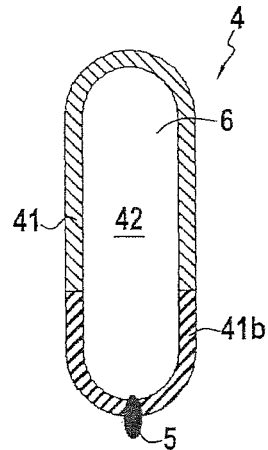
Figure 14:
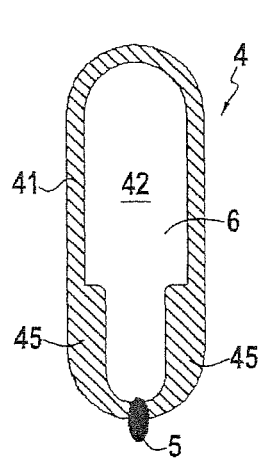

A third variant embodiment of a pressure-measurement chamber with envelope of variable stiffness consists, as shown in FIG. 13, of making a composite envelope 41 of several materials or elements 41a, 41b having different mechanical properties or even several elements 41a, 41b of the same material having different mechanical properties and joined together tightly by welding or adhesion.

Finally, a last possible embodiment of a pressure-measurement chamber 4 with envelope 41 of variable stiffness consists of procuring an envelope 41 having locally variations in thickness 45 to produce increased stiffness of the envelope 41 at the level of these variations in thickness 45.

According to these different realisations, it is possible to simply make an envelope 41 of pressure-measurement chamber 4 for the pressure sensor 1 whereof the geometric and mechanical properties can be modulated as a function of the preferred overall stiffness and sensitivity.

Therefore, as described earlier, the overall compression stiffness of the pressure-measurement chamber 4 can be adjusted by varying the thickness and the properties of the material constituting the envelope 41, by introducing more or less compressible materials inside the pressure-measurement chamber or by further varying the local thickness of the envelope 41.

Similarly, it can also be considered to modify the overall form of the envelope 41 of the pressure-measurement chamber 4. So, an envelope 41 in the form of a sphere is more rigid than an envelope 41 of lenticular form.

It must be considered that the pressure-measurement chambers 4 have a form allowing omnidirectional measuring, not limited by rigid directional pieces.

The conditions of filling the envelope 41 by the incompressible fluid 6 can also be varied.

The pressure sensor 1 described hereinabove is used and operates as follows:

A dummy 2 as illustrated in FIG. 1 and comprising a pressure sensor 1 in the trunk 22, at the level of the abdomen, is placed in a vehicle, in one of the places usually occupied by a human being, by being held in this place by a safety harness, such as a safety belt whereof the pelvic part passes over the pelvis 23. The pressure sensor 1, and more particularly the pressure-measurement cells 5 of the latter are for example attached electronically by cables or electric bus to an acquisition and signal-processing unit. This acquisition unit can especially comprise analog/digital converters of electric signals to make for easier analysis of acquired data.

The vehicle is accelerated normally over a certain distance, then subjected to shock to simulate an accident likely to occur in reality, the known technique consisting of projecting the vehicle against an obstacle and/or reciprocally or having several vehicles collide into each other, for example.

During the first phase, when the vehicle is stopped, the pressure sensor 1 is in the rest state and the signal delivered by the pressure-measurement cells 5 of the pressure-measurement chambers 4 is zero or considered such. Optional resetting can be achieved by setting the equilibrium of the measuring bridge in which the strain gauges are inserted.

However, in the acceleration phase, and especially in shock phase, the holding forces transiting via the belts of the safety harness cause pressure acting on the pelvis 23 and the trunk 22 of the dummy 2, which are transmitted to the pressure sensor 1 located in the zone of the abdomen of the trunk 22.

If the pelvic strap of the safety belt remains localised on the pelvis, then the forces from the belt are largely transmitted to the osseous pelvis, largely safeguarding the abdomen and its loading sensor. It should be noted that this is the preferred operation in the use of the safety belt and that this type of operation does not generate abdominal lesion. On the contrary, if the belt is positioned too high or slides upwards off the pelvis during deceleration (submarine phenomenon), the pelvic belt directly presses into the abdomen of the dummy 2 and compresses the pressure-measurement chambers 4, which replace and play the role of organs (liver, viscera, spleen, stomach) of the abdomen of the dummy 2. Inside the pressure-measurement chambers 4, the pressure of the incompressible fluid 6 varies as a function of the intensity of forces which act on the latter. The pressure-measurement cells 5 of each pressure-measurement chamber 4 deliver a signal which varies as a function of variations in pressure of the incompressible fluid 6. Reciprocally, studying variations of the signal output by the pressure-measurement cells 5 analyses the effects produced by the retaining straps during shock undergone by the vehicle, on the abdomen and on the intra-abdominal mass, according to the form of straps, their attachment position, the material comprising them, etc.

The pressure chambers 4 can also be sensitive to loading direct of the diagonal belt if it is poorly positioned, for example under the arm. Similarly, if the diagonal belt or an intrusion for example of the door in lateral shock substantially deforms the base of the thorax, the loading can then be transmitted to the upper part of the pressure chambers 4.

The invention claimed is:

1. The pressure sensor (1) for measuring pressures undergone by an anthropomorphic dummy (2) in an abdominal or thoracic section of the trunk of said dummy, characterized in that it comprises at least two tight and flexible pressure-measurement chambers (4) arranged in the abdominal or thoracic section of the trunk of said dummy on either side of a median sagittal plane (P) of said abdominal or thoracic section, said pressure-measurement chambers (4) being filled with incompressible fluid (6) whereof the pressure varies as a function of the intensity of the forces exerted on said chambers which each comprise at least one pressure-measurement cell (5) capable of delivering at its outlet an electric signal representative of the pressure of said fluid (6) in said pressure-measurement chambers.

2. The pressure sensor according to claim 1, characterized in that the pressure-measurement chambers (4) comprise several internal compartments (42a, 42b) separated by a partition (43) and each filled with incompressible fluid (6), the chambers each comprising at least one pressure-measurement cell (5).

3. The pressure sensor according to claim 1, characterized in that the pressure-measurement chambers (4) comprise several internal compartments (42a, 42b) communicating with each other such that the incompressible fluid (6) is capable of circulating between said compartments, said chambers comprising at least one pressure-measurement cell (5).

4. The pressure sensor according to claim 1, characterized in that the incompressible fluid (6) for filling of the pressure-measurement chambers (4) is a choice of liquid, gel or emulsion.

5. The pressure sensor according to claim 1, characterized in that the pressure-measurement chambers (4) are constituted by an envelope (41) of flexible material.

6. The pressure sensor according to claim 5, characterized in that the pressure-measurement chambers (4) are constituted by an envelope (41) of polyurethane.

7. The pressure sensor according to claim 5, characterized in that the pressure-measurement chambers (4) are housed in recesses (31) provided to this effect in the abdominal or thoracic section of the dummy and removable from these recesses (31).

8. The pressure sensor according to claim 5, characterized in that the envelope (41) of the pressure-measurement chambers (4) locally has variations in stiffness.

9. The pressure sensor according to claim 5, characterized in that the envelope (41) of the pressure-measurement chambers (4) locally has variations in thickness to produce a local variation in the stiffness of the envelope (41).

10. The pressure sensor according to claim 5, characterized in that the envelope (41) of the pressure-measurement chambers (4) locally comprises external superficial reinforcements (9) constituted by a layer of additional material stuck to an external surface of the envelope (41) to produce a local variation in stiffness of the envelope.

11. The pressure sensor according to claim 5, characterized in that the envelope (41) of the pressure-measurement chambers (4) is constituted by several materials having different mechanical properties or several elements of a same material having different mechanical properties and linked tightly by welding or adhesion.

12. The pressure sensor according to claim 7, characterized in that the pressure-measurement chambers (4) are blocked in vertical and/or horizontal translation in their recess by a mutual link (7, 8) or by adherence to a surface of the recesses (31).

13. The pressure sensor according to claim 1, characterized in that each pressure-measurement chamber (4) comprises at least two pressure-measurement cells (5) in two positions opposite the pressure-measurement chamber.

14. The pressure sensor according to claim 1, characterized in that the pressure-measurement chambers (4) have a revolution form.

* * * * *